J. R. GAMMETER.
METHOD OF AND APPARATUS FOR VULCANIZING.
APPLICATION FILED APR. 18, 1910.
1,129,084.
Patented Feb. 23, 1915.
4 SHEETS—SHEET 3.
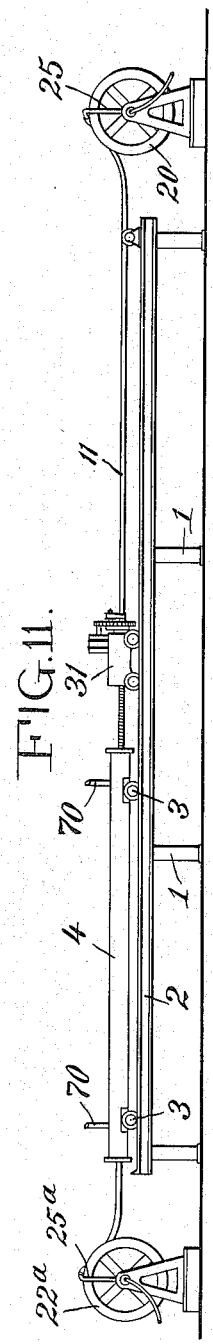
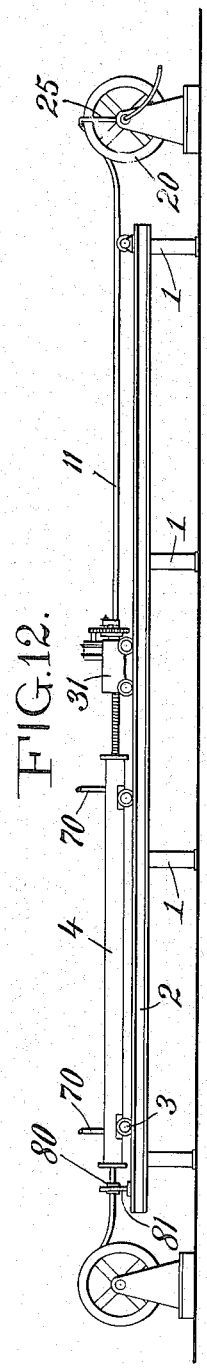
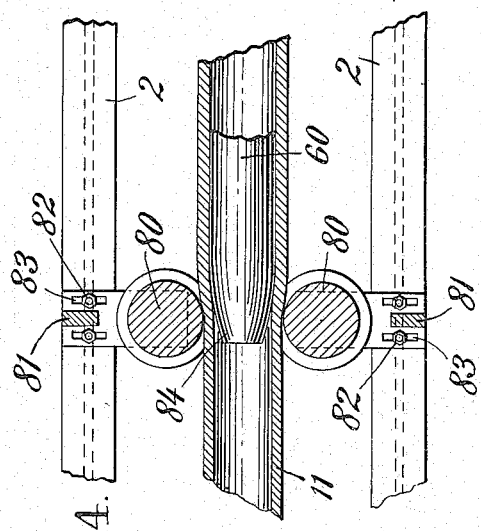
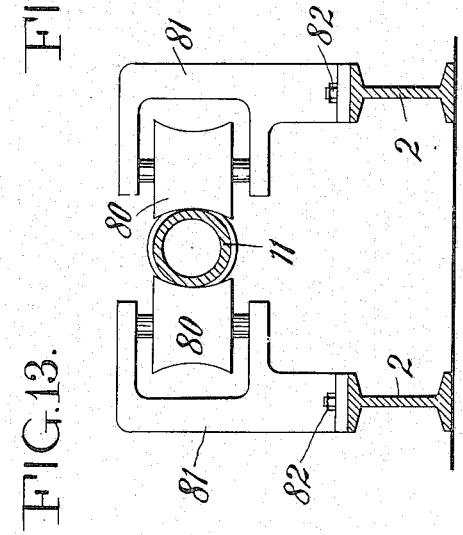
Witnesses:
Karl S. Dietz
Edmund Quincy Moses
John R. Gammeter, Inventor
By his Attorney
Edward Davis J. R. GAMMETER.
METHOD OF AND APPARATUS FOR VULCANIZING.
APPLICATION FILED APR. 18, 1910.
1,129,084.
Patented Feb. 23, 1915.
4 SHEETS—SHEET 4.
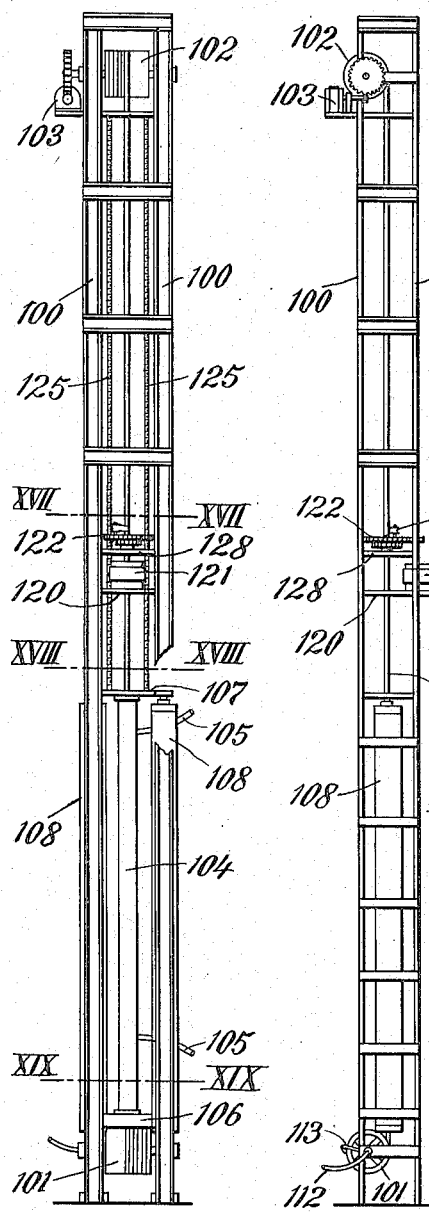
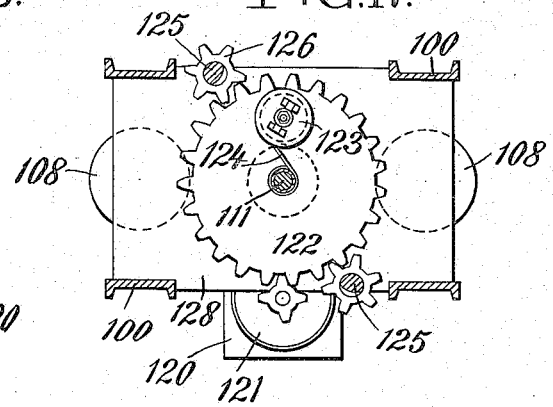
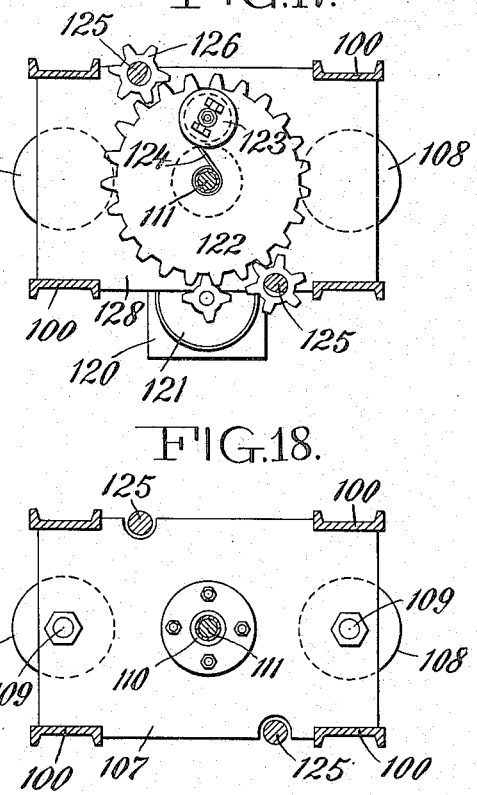
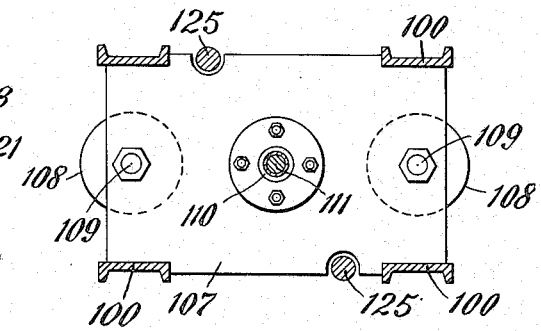
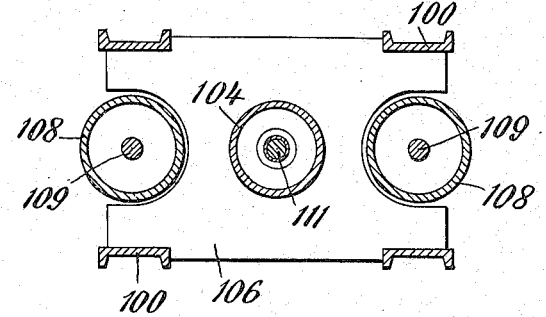

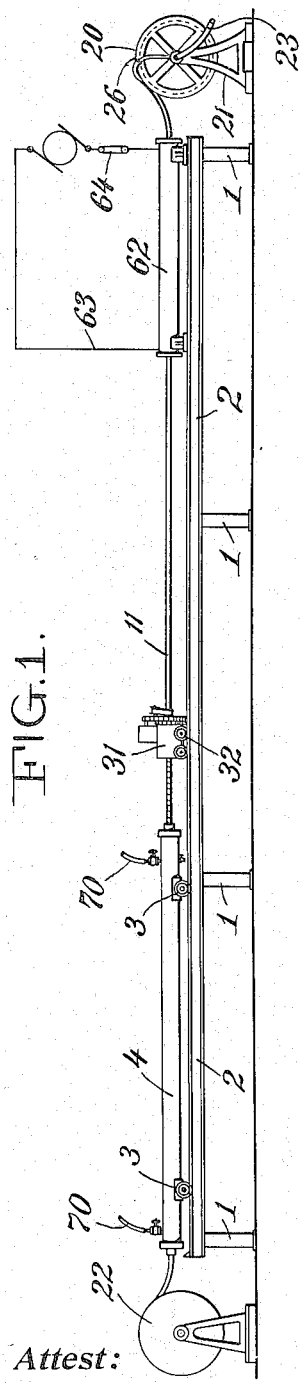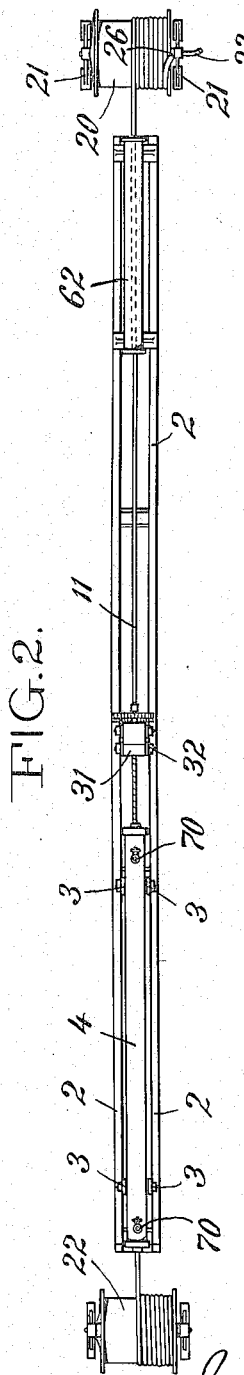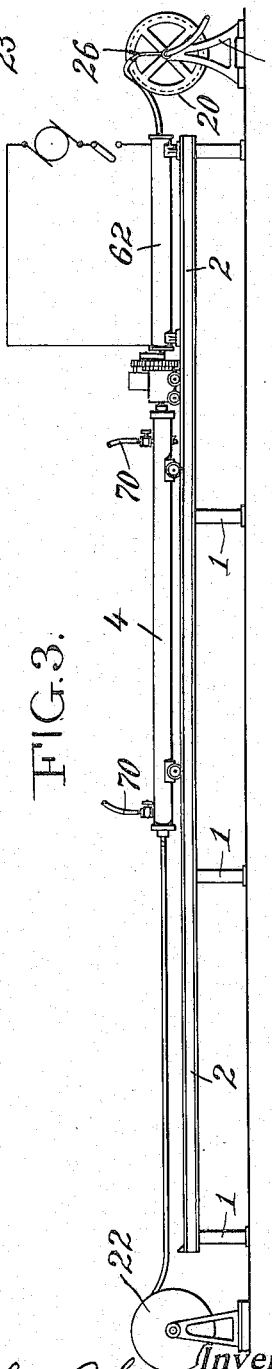

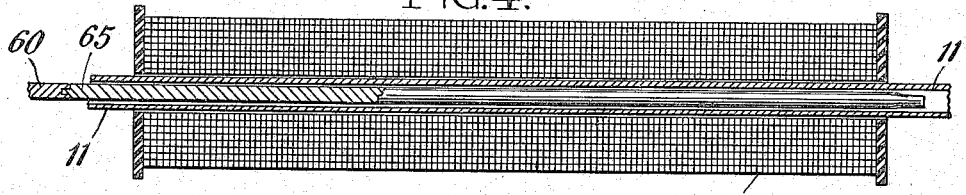
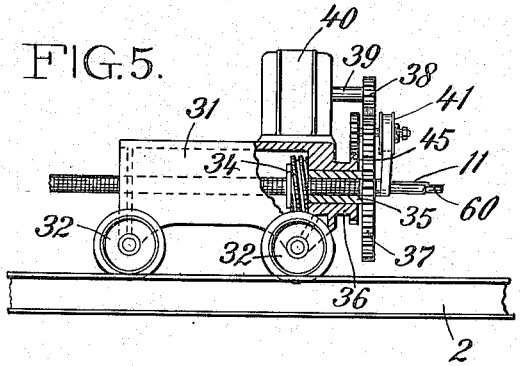
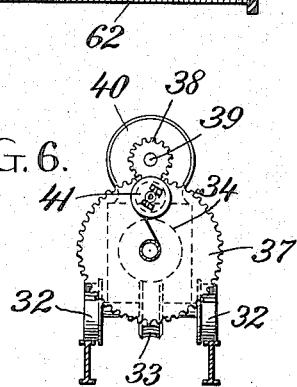
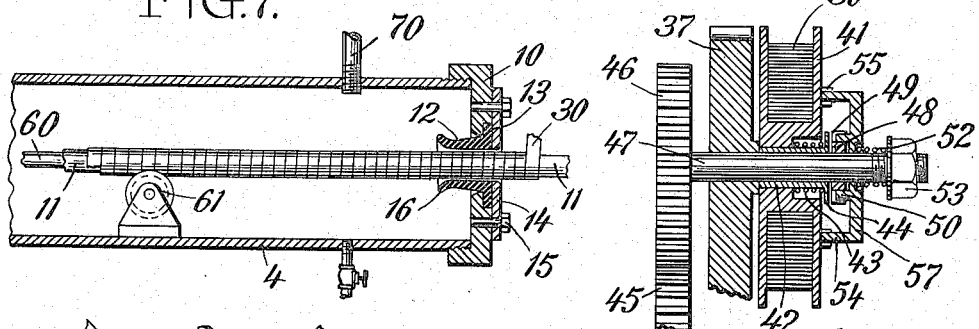
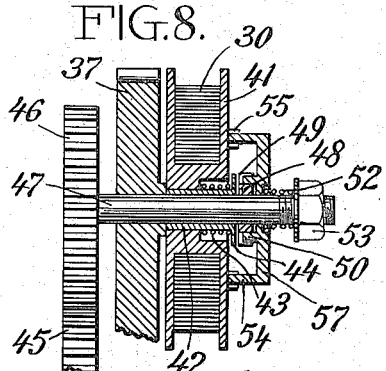
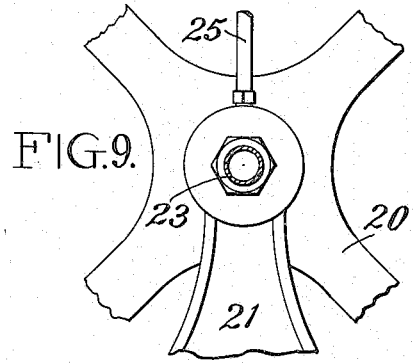
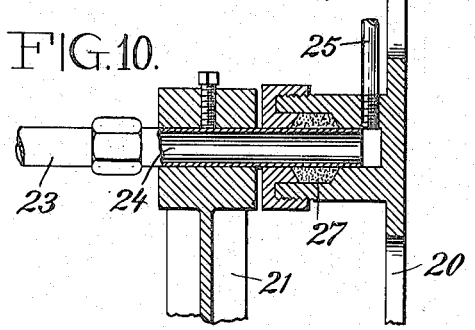

UNITED STATES PATENT OFFICE.

JOHN R. GAMMETER, OF AKRON, OHIO, ASSIGNOR, BY MESNE ASSIGNMENTS, TO THE B. F. GOODRICH COMPANY, A CORPORATION OF NEW YORK.

METHOD OF AND APPARATUS FOR VULCANIZING.

1,129,084.  Specification of Letters Patent.  Patented Feb. 23, 1915.

Application filed April 18, 1910. Serial No. 556,200.

*To all whom it may concern:*

Be it known that I, JOHN R. GAMMETER, a citizen of the United States, residing in the city of Akron, county of Summit, and State of Ohio, have invented certain new and useful Improvements in Methods of and Apparatus for Vulcanizing, of which the following is a specification.

This invention relates to improvements in the art of vulcanizing, applicable to the vulcanization of long articles, such as hose, tubing, rubber tires and the like, being especially designed for the vulcanization of hose in long lengths.

The invention also contemplates certain improvements in vulcanizing apparatus.

The vulcanization of hose has heretofore been carried on in a variety of different ways, each of which, however, is subject to certain disadvantages. For instance, hose is sometimes vulcanized by inserting the same in long, straight, rigid molds, supporting the interior of the hose by means of a mandrel projecting slightly at each end of the length of hose. As is obvious, however, with this practice, the length of the pieces in which the hose can be vulcanized is strictly limited and can never be very great. Another process of vulcanizing which is sometimes used for small tubing is to cover the same with a lead jacket, and after coiling the hose and jacket, inserting the same in a vulcanizing chamber. The interior of the hose is supported by filling the same with compressed air, etc. With this process the hose is vulcanized in coil form, which gives it a permanent set, causing it always to tend to assume a curvilinear shape. It is also impossible to use a rigid mandrel for supporting the interior of the hose.

It is an object of my invention to provide an improved process and apparatus by which all of these disadvantages may be overcome, and I accomplish this object by vulcanizing the hose or other article to be vulcanized preferably while in a rectilinear condition, supporting the interior of the article where necessary by means of a rigid mandrel. I do not require either a mold or vulcanizing chamber or mandrel as long as the article to be vulcanized, but subject successive portions of the latter to the vulcanizing action.

Other objects of my invention will appear as the nature of the same is described in detail in the following specification, wherein I have set forth the means by which these objects are attained in the best mode now known to me of practising my invention.

In the accompanying drawings which form a part of this specification,

Figure 1 is a diagrammatic view in side elevation illustrating one form of my apparatus; Fig. 2 is a plan view of the apparatus shown in Fig. 1; Fig. 3 is a view similar to Fig. 1 with the vulcanizing chamber shown moved to operative position; Fig. 4 is a longitudinal sectional view of the solenoid showing a part of the mandrel; Fig. 5 is a detail side elevation of the wrapping machine, parts being shown in section; Fig. 6 is an end elevation of the wrapping machine; Fig. 7 is a detail longitudinal sectional view of a portion of the vulcanizing chamber showing the construction of the stuffing-box; Fig. 8 is a detail sectional view of the reel and driving means therefor, forming part of the wrapping machine; Figs. 9 and 10 are detail views of the hollow reel trunnion showing the connections for admitting compressed air to the hose on the reel; Fig. 11 is a diagrammatic side elevation of a form of my apparatus in which means are provided for admitting compressed air into the hose at each end; Fig. 12 is a similar view of another modification of my apparatus; Figs. 13 and 14 are detail views of the pinching rolls forming a part of the apparatus shown in Fig. 12; Figs. 15 and 16 are front and side elevations, respectively, of a modification of my apparatus in which the hose is vulcanized while in a vertical position; Figs. 17, 18 and 19 are horizontal sectional views taken on lines XVII—XVII, XVIII—XVIII and XIX—XIX, respectively, on Fig. 15.

Referring to the drawings in detail and particularly to the modification illustrated in Figs. 1 to 10, inclusive, the numeral 1 designates a base comprising a pair of horizontal guides or rails 2 which support the rollers 3 carrying the vulcanizing chamber 4. The latter comprises preferably a metal cylinder provided with heads 10 perforated to permit passage of the hose 11 therethrough. In order to make the chamber 4 steam tight and prevent the escape of steam through the perforations in the heads about the hose, I provide some suitable form of a stuffing-box through which the hose passes, preferably that shown in Fig. 7. The stuffing-box shown comprises a sleeve 12 of soft rubber of such a composition that it will stand a greater degree of heat than the hose and will not harden through long exposure to steam. This sleeve is provided with a flange 13 which fits in a recess in the head 10 and is locked therein by a flat ring 14 secured to the head by bolts 15. The inner end of the sleeve 12 preferably flares slightly, as indicated at 16. The pressure of the steam on the sleeve forces the same against the hose, making a tight joint. The green or unvulcanized hose is carried upon a reel 20 mounted in suitable supports 21 at one end of the guides, while the vulcanized hose is wound upon a reel 22 mounted at the other end of the guides. Means are preferably provided for admitting compressed air or other fluid under pressure to the interior of the hose, these means being located at one or both ends of the latter, as may be desired. As shown, the air is admitted through a pipe 23 to the end of the hollow trunnion 24 of the reel 20. A pipe 25 leads from the trunnion, to the periphery of the reel, where it is curved over, as indicated at 26, and enters the end of the hose. The reel is thus capable of being rotated without interfering with the air connection. The trunnion 24 may pass through a stuffing-box 27 in the end of the reel to prevent leakage.

For compression, outside finish and for protecting the exterior of the hose during vulcanization a wrapping 30 of canvas or other suitable material is preferably applied thereto before the section of hose to be vulcanized is inclosed in the vulcanizing chamber. This wrapping may be applied by hand or by any suitable apparatus, such, for example, as that shown in Figs. 5, 6 and 8. The machine shown in these figures comprises a carriage 31 mounted on rollers 32 adapted to travel on the rails 2, one pair of rollers being fixed to their axle, to which is secured a driving worm gear 33. The latter receives power from a worm 34 fixed to one end of a sleeve 35, which is journaled in a bearing 36 forming part of the carriage. The outer end of the sleeve 35 has fixed to it a large gear 37 which is driven by a pinion 38 carried on the shaft 39 of the motor 40. The hose passes through the sleeve 35 and through openings in the gear 37 and worm 34. The wrapping band 30 is wound upon a spool 41 journaled upon a tubular bearing 42 projecting from the face of the gear 37. The wrapping machine is preferably arranged to commence the wrapping operation when located about the middle of the guides, the vulcanizing chamber being pushed to its extreme left-hand position, as shown in Fig. 1, the wrapping being performed while the machine is traveling slowly toward the right. The motor 40, besides causing the travel of the machine, rotates the gear 37, thus carrying the spool 41 around the hose and causing the band 30 to be fed from the spool and wrapped about the hose. In order to prevent the spool 41 from turning too freely, some means for putting it under frictional control, such, for instance, as the spring 43, engaging the spool and the flange 44 on the tubular bearing 42, is provided.

After a section of the hose has been wrapped and the wrapping machine moved to its extreme right-hand position, as shown in Fig. 3, the vulcanizing chamber 4 is moved over the wrapped portion of the hose and the same is vulcanized, after which the chamber is returned to its left-hand position and the wrapping machine reversed to unwind the wrapper. In order to cause it to perform this function means are provided for rotating the spool 41 to cause it to wind up the band 30. Various devices for accomplishing this purpose may be used, one of which is illustrated in Figs. 5, 6 and 8. This mechanism comprises a gear 45 fixed to the end of bearing 36, with which meshes a pinion 46 carried upon one end of a short shaft 47 journaled in an opening in the gear 37 and in the tubular bearing 42, and having fixed to it, beyond the end of the tubular bearing, a collar 48. This collar is provided with one or more notches 49 adapted to receive lugs 50 projecting from a driving-dog 51 loosely mounted upon the shaft 47. The dog is urged in the direction of the spool by a spring 52 which is retained in engagement with it by a nut 53 on the end of the shaft 47. The dog is provided with fingers 54 which engage lugs 55 projecting from the spool. It will be seen that when the parts are in the position shown in Fig. 8 and the gear 37 is rotated, the pinion 46 carried thereby and engaging with the fixed gear 45 will also be rotated about its own axis, thus driving the shaft 47, which, through the collar 48 and dog 51, drives the spool 41 in a direction to cause it to wind up the band 30. When, however, the wrapping machine is being driven in the other direction, to wind the band about the hose, the dog 51 is drawn back against the tension of spring 52 until the lugs 50 and fingers 54 have, respectively, disengaged the notches 49 and lugs 55, when the dog can be rotated slightly to bring the lugs 50 opposite unnotched portions of the collar 48. The dog will thus be held in retracted position and the spool 41 will be free to revolve as the band 30 is drawn from it, except for the slight retardation produced by the spring 43.

In order to support the hose during vulcanization and prevent it from collapsing or becoming indented, I insert within the hose a mandrel 60 which is preferably of about the same length as the guides. As I propose to vulcanize great lengths of hose, drawing it from a reel at one end of the apparatus and winding it up when vulcanized at the other, it is obvious that the mandrel cannot be supported at its ends in the usual manner, and I therefore make the hose carry the mandrel, providing suitable means for supporting the hose, such as the rollers 61 or guiding channels in the vulcanizing chamber 4. In order to anchor the mandrel and prevent its moving forward when the hose is advanced, I provide a solenoid 62 included in an electric circuit 63, a switch 64, or other suitable means, being provided for opening and closing this circuit. The end of the mandrel which forms the armature of the solenoid comprises a section 65 of suitable magnetic material, preferably iron, while the remainder of the mandrel is most advantageously made of aluminum or other light non-magnetic material. Instead of a single solenoid I may use a series of solenoids.

The operation of the form of my apparatus above described is as follows: A reel of green hose is placed on the standards 21 and one end of the hose is connected to the air pipe 25. The other end of the hose is unwound from the reel, slipped over the end of the mandrel and drawn through the solenoid 62. It is then drawn along the mandrel and passed through the sleeve 35 of the wrapping machine and a section of it of about the length of the vulcanizing chamber is wrapped. The vulcanizing chamber is then moved over this wrapped portion into the position shown in Fig. 3, when steam is circulated through it by means of the flexible pipes 70. After the wrapped hose has been subjected to the action of the steam for a sufficient length of time, the steam is turned off and the vulcanizing chamber returned to the position shown in Fig. 1. The wrapping machine is then driven toward the left, unwrapping the band from the hose as it goes. Switch 64 is then closed, energizing the solenoid 62 and at the same time compressed air is admitted to the interior of the hose. This expands the hose slightly away from the mandrel and permits it to be drawn readily over the mandrel, which is maintained in its normal position by the action of the solenoid upon the magnetic portion 65 of the mandrel. After a section of the hose of a length equal to that of the vulcanizing chamber has been fed from the reel 20 and over the mandrel, the air pressure is cut off, switch 64 opened and the new section of hose wrapped, vulcanized and unwrapped, as above described. Of course, if desired the solenoid 62 may be maintained energized at all times, but it is usually found more economical to close the circuit through the same only when the hose is to be advanced.

In Fig. 11 I have shown a modification of my apparatus in which I dispense with the solenoid and the magnetic section of the mandrel and substitute for the reel 22, upon which the vulcanized hose is wound, a reel 22$^a$ provided with a pipe 25$^a$ adapted to be inserted in the end of the hose, so that the compressed air may be forced into the hose from both ends. By properly governing the admission of air into the two ends of the hose, the mandrel may be maintained in its proper position while the hose is being advanced, just as in the form of my apparatus in which the solenoid is used. As will be apparent, if the air pressure entering through the pipe 25$^a$ is increased over that entering the hose through the pipe 25, the mandrel may be urged in the direction of the reel 20 just sufficiently to counteract its tendency to move in the opposite direction through friction with the walls of the hose, the result being to maintain the mandrel in substantially fixed position. The wrapping machine 31 and vulcanizing chamber 4 used in this form of my apparatus are the same as those already described.

In Fig. 12 I have shown a further modification of my invention in which a pair of pinching rolls are mounted to engage the hose at a point even with or just beyond the end of the mandrel. These rolls 80 are preferably journaled in brackets 81 bolted to the guides by bolts 82 which pass through slots 83 in the bases of the brackets. The brackets are thus made adjustable to permit the rolls to be brought nearer together or separated to adjust the amount of contraction of the hose, or to accommodate hose of different sizes. The end of the mandrel is preferably tapered, as indicated at 84, so that when the hose is contracted in diameter by the rolls 80 and passed between them, the mandrel will be stopped and will be subjected to a constant wedging action which will in effect continually squeeze it back and prevent its advancement. The compressed air may be admitted at both ends of the hose, as in the form of my invention illustrated in Fig. 11, if so desired, but this is not essential, and I have shown an air connection at the unvulcanized end of the hose only. The operation of this form of my apparatus is the same as that of the form first described, except that the pinching rolls are relied upon, in place of the solenoid, to prevent the advancement of the mandrel.

In Figs. 15 to 19, inclusive, I have shown a modification of my invention in which the apparatus is arranged vertically, thus permitting the force of gravity to be used to prevent the movement of the mandrel with the hose. In this form of my apparatus four vertical guides 100 are used, at the lower ends of which is arranged the reel 101 for the green hose, while at the upper ends is mounted the reel 102 for the vulcanized hose. A motor 103 is preferably provided for rotating this reel to cause it to wind up the hose. The vulcanizing chamber 104 is supplied by flexible steam pipes 105 and is carried by cross-heads 106 and 107 which slide between the guides. Suitable means are provided for raising and lowering the vulcanizing chamber, such as the hydraulic cylinders 108, the plungers 109 of which are secured to the cross-head 107. The hose 110 passes from the reel 101 up through this vulcanizing chamber and through the wrapping machine to the reel 102, and contains within it the mandrel 111. As the latter is rigid it cannot pass below the point in the hose where the latter turns to wind about the reel 101. It is accordingly supported by the hose at that point and also by the friction of the hose throughout its length. Compressed air is also preferably supplied to the hose at its lower end through pipes 112 and 113. The wrapping machine used in this form of my apparatus is constructed to operate upon the same principle as that shown in Figs. 5, 6 and 8, it comprising a frame 120 carrying a motor 121, which drives the main gear 122, to which is journaled the spool 123. The spool 123 carries the band 124 which is wrapped about the hose and unwrapped therefrom in the same manner as the band 30 in the form previously described. The connections for driving this spool are preferably the same as those shown in Fig. 8. In order to move the wrapping machine up and down during the wrapping and unwrapping operations, I provide a pair of vertical screw-threaded rods 125 supported by the guides, with which engage a pair of toothed nuts 126 carried by the frame of the wrapping machine, the teeth of these nuts being engaged by the teeth of the main motor-driven gear 122. The operation of this form of my apparatus is similar to that already described: Supposing the parts to be in the position shown in Figs. 15 and 16, the wrapping machine is caused to travel upward and wrap a section of the hose. The vulcanizing chamber is then raised by the action of the hydraulic cylinders to inclose the wrapped portion of the hose, when steam is admitted to it for a time sufficient to effect vulcanization. The vulcanizing chamber is then lowered to the position shown and the wrapping machine caused to travel to its original position, unwrapping the vulcanized hose on its way. Air pressure is then admitted to the hose to expand the same away from the mandrel and the motor 103 is started, causing the vulcanized hose to be wound upon the reel 102, the mandrel being prevented from moving with the hose by gravity. The operations of wrapping and vulcanizing are then repeated.

I have set forth above and illustrated in the drawings certain preferred forms of apparatus embodying my invention and by which my improved process may be carried out, but I do not desire to limit myself to the exact mechanism shown, nor to the specific features of the described process.

My process may be carried out by means other than those illustrated, and some portions, at least, of the apparatus may be used for purposes other than the carrying out of my improvements in process.

Having thus described my invention, I claim:

1. The method of vulcanizing articles in long lengths, which consists in supporting a section of the article in non-coiled position, moving a vulcanizing chamber longitudinally over said section, and vulcanizing the section of the article within the chamber.

2. The method of vulcanizing articles in long lengths which consists in supporting a section of the article in non-coiled position, preparing that section of the article for vulcanization, moving a vulcanizing chamber over said prepared section, and subjecting said prepared section to a vulcanizing action.

3. The method of vulcanizing articles in long lengths which consists in supporting a section of the article in undistorted position wrapping that section of said article, moving a vulcanizing chamber longitudinally over said wrapped section and subjecting the same to a vulcanizing action.

4. The method of vulcanizing articles in long lengths, which consists in supporting a portion of the article in position to be vulcanized, wrapping a portion of the article, moving a vulcanizing chamber longitudinally over said wrapped portion, subjecting the portion within the chamber to a vulcanizing action, removing said vulcanizing chamber longitudinally from said vulcanized portion, unwrapping said vulcanized portion, advancing the article, and repeating the enumerated steps until the desired length of the article has been vulcanized.

5. The method of vulcanizing, which consists in supporting an article in position to be vulcanized, moving a wrapping and unwrapping machine longitudinally over a portion of said article, and causing said machine to wrap a band spirally about said portion, moving a vulcanizing chamber longitudinally of said article toward said wrapping machine, to cause the same to inclose the wrapped portion of the article, subjecting the wrapped portion of said article to a vulcanizing action, moving said vulcanizing chamber longitudinally away from said wrapping machine to expose the wrapped and vulcanized portion of said article, and moving said wrapping machine longitudinally of said article in the direction of said vulcanizing chamber while causing it to unwrap said spiral band.

6. The method of vulcanizing tubing which consists in inserting into the tubing a mandrel shorter than the tubing, vulcanizing a portion of the tubing containing the mandrel, and advancing the tubing while maintaining the mandrel substantially stationary.

7. The method of vulcanizing continuous tubing, which consists in supporting successive portions of the tubing in position to be vulcanized with a mandrel contained in such portion, moving a vulcanizing chamber over the portion containing said mandrel, and subjecting that portion of the tubing to a vulcanizing action.

8. The method of vulcanizing tubing which consists in supporting the tubing in position to be vulcanized with a mandrel contained therein, moving a vulcanizing chamber thereover, subjecting the tubing within the chamber to a vulcanizing action, withdrawing the chamber from the vulcanized tubing, and advancing the tubing while maintaining the mandrel in substantially its original position.

9. The method of vulcanizing tubing, which consists in inserting a mandrel within the portion of the tubing to be vulcanized, supporting the tubing and contained mandrel within a vulcanizing chamber, subjecting the tubing to a vulcanizing action, advancing the tubing to bring an unvulcanized portion thereof into position to be vulcanized while maintaining the mandrel substantially stationary, vulcanizing the new section of tubing, and repeating the process until the desired length of tubing has been vulcanized.

10. The method of vulcanizing tubing which consists in inserting a mandrel within the tubing, wrapping a portion of the tubing containing the mandrel, vulcanizing the wrapped portion of the tubing, unwrapping the vulcanized portion of the tubing, and advancing the tubing while maintaining the mandrel substantially stationary.

11. The method of vulcanizing tubing which consists in inserting a mandrel within the tubing, supporting the tubing with the mandrel contained therein in position to be vulcanized, wrapping a portion of the tubing containing the mandrel, inclosing said wrapped portion in a vulcanizing chamber, and vulcanizing the same, removing the vulcanizing chamber from said wrapped and vulcanized portion, unwrapping the same, and advancing the tubing while maintaining the mandrel substantially stationary.

12. The method of vulcanizing tubing, which consists in inserting a mandrel within the tubing, vulcanizing a portion of the tubing containing the mandrel, expanding the tubing, and advancing the tubing while maintaining the mandrel substantially stationary.

13. The method of vulcanizing tubing, which consists in inserting a mandrel within the tubing, vulcanizing a portion of the tubing containing the mandrel, admitting compressed air into the tubing, and advancing the tubing while maintaining the mandrel substantially stationary.

14. The method of vulcanizing tubing which consists in inserting a mandrel within the tubing, wrapping a portion of the tubing containing the mandrel, vulcanizing the wrapped portion of the tubing, unwrapping the vulcanized portion of the tubing, expanding the tubing, and advancing the tubing while maintaining the mandrel substantially stationary.

15. The method of vulcanizing tubing which consists in inserting a mandral, a portion of which is composed of magnetic material, within the tubing, vulcanizing a portion of the tubing containing the mandrel, creating a magnetic field about the portion of the tubing within which the magnetic portion of the mandrel is located, and advancing the tubing.

16. In vulcanizing apparatus, in combination, means for supporting the article to be vulcanized in non-coiled position, means for preparing a portion of said article for vulcanization, and a vulcanizing chamber capable of being moved over said prepared portion.

17. In vulcanizing apparatus, in combination, means for supporting the article to be vulcanized, means for wrapping said article, and a vulcanizing chamber movable over said wrapped portion of the article.

18. In vulcanizing apparatus, in combination, a guideway, and a vulcanizing chamber and a wrapping machine movable longitudinally of said guide-way.

19. In vulcanizing apparatus, in combination, a vulcanizing chamber, a mandrel passing therethrough, and of greater length than said chamber, said chamber being movable longitudinally of said mandrel, and means for maintaining said mandrel substantially stationary during the movement of said vulcanizing chamber.

20. In apparatus for vulcanizing tubing, in combination, a mandrel of less length than that of the tubing to be vulcanized, and means located out of the path of movement of the tubing for maintaining said mandrel substantially stationary when the tubing is moved.

21. In apparatus for vulcanizing tubing, in combination, a mandrel and means for anchoring the same in substantially stationary position while the tubing is advanced, said means acting upon the mandrel through the walls of the tubing.

22. In vulcanizing apparatus, in combination, a vulcanizing chamber, a mandrel extending therethrough, and having a portion formed of magnetic material, and means for holding said mandrel comprising a device for creating a magnetic field about said magnetic portion.

23. In combination, a mandrel, means for holding said mandrel in position comprising a solenoid surrounding a portion thereof, and means for treating a tube inclosing said mandrel.

24. In combination, a mandrel, a portion of which at least is composed of magnetic material, and means for holding said mandrel comprising a device for creating a magnetic field about said magnetic portion.

25. In vulcanizing apparatus, in combination, a mandrel of less length than the article to be vulcanized, and means for maintaining said mandrel substantially stationary within said article while the article is advanced thereover.

26. In vulcanizing apparatus, a mandrel of less length than the article to be vulcanized, means for maintaining said mandrel substantially stationary within said article while the article is advanced thereover, and means for facilitating the advancement of said article.

27. In apparatus for vulcanizing tubing, a mandrel, means exterior thereto for maintaining the same within the tubing and substantially stationary while the tubing is advanced, and means for expanding the tubing.

28. In apparatus for vulcanizing tubing, in combination, a mandrel, means exterior thereto for maintaining the same within the tubing and substantially stationary while the tubing is advanced, and means for admitting compressed air to the tubing.

29. In apparatus for vulcanizing tubing, in combination, a mandrel of less length than the tubing to be vulcanized, a movable vulcanizing chamber, also of less length than the tubing to be vulcanized, and means for admitting compressed air to the interior of the tubing.

30. In vulcanizing apparatus, in combination, a mandrel, a wrapping machine movable longitudinally of said mandrel, and a vulcanizing chamber movable longitudinally of said mandrel independently of said wrapping machine.

31. In vulcanizing apparatus, in combination, a mandrel, a wrapping machine movable logitudinally of said mandrel, a vulcanizing chamber movable longitudinally of said mandrel independently of said wrapping machine, and means for maintaining said mandrel in substantially stationary position.

32. In vulcanizing apparatus, in combination, a guideway, a solenoid mounted at one end thereof, a mandrel supported adjacent to said guide-way, one end of said mandrel being located within said solenoid, said end being formed of magnetic material, and a vulcanizing chamber and a wrapping machine movably mounted upon said guide-way.

33. In vulcanizing apparatus, in combination, a solenoid, and a movable vulcanizing chamber having alined openings therethrough, and a mandrel entering said solenoid and chamber, the portion of the mandrel within the solenoid being composed of magnetic material.

34. In vulcanizing apparatus, in combination, a solenoid, a wrapping machine and a movable vulcanizing chamber, said devices having alined openings therethrough, and a mandrel extending through said openings, the length of said mandrel being substantially equal to the sum of the lengths of said solenoid and wrapping machine and twice the length of said chamber.

35. In apparatus for vulcanizing articles in long lengths, a vulcanizing chamber, said chamber being mounted to move longitudinally of the article, and flexible connections for supplying a heating medium to said chamber.

36. In vulcanizing apparatus, a vulcanizing chamber, a mandrel extending therethrough, and a solenoid situated about one end of said mandrel to thereby hold it in position.

JOHN R. GAMMETER.

Witnesses:
WALTER K. MEANS,
MARCUS H. HILL.